United States Patent [19]

Sisson et al.

[11] 4,053,033

[45] Oct. 11, 1977

[54] PRESSURE LIMITER MEANS FOR CONTROLLING THE OPERATION OF A SOLENOID VALVE

[75] Inventors: Albert E. Sisson; Henry Dorsett, both of LaPorte, Ind.

[73] Assignee: The Bendix Corporation, South Bend, Ind.

[21] Appl. No.: 701,827

[22] Filed: July 1, 1976

[51] Int. Cl.² ............................................. B60T 7/20
[52] U.S. Cl. ........................... 188/112; 180/103 BF; 200/83 A; 200/83 N; 200/835; 303/7
[58] Field of Search .................. 180/103 BF, 104; 188/3 R, 112; 200/83 R, 83 A, 83 N, 83 Q, 83 S; 280/432, 446 B; 303/7, 20, DIG. 2; 340/52 B, 52 C

[56] References Cited

U.S. PATENT DOCUMENTS

| 3,168,352 | 2/1965 | Stelzer | 303/7 |
| 3,790,807 | 2/1974 | Rossigno | 303/7 |
| 3,880,472 | 4/1975 | Lewis et al. | 188/112 UX |
| 3,983,787 | 10/1976 | Hendrickson | 303/7 X |

*Primary Examiner*—Stephen G. Kunin
*Attorney, Agent, or Firm*—Leo H. McCormick, Jr.; Ken C. Decker

[57] ABSTRACT

A pressure responsive switch for modifying an actuation signal generated through a solenoid valve responding to a sway control signal to limit the operation of a brake applying servomotor and thereby prevent locking of the wheel brakes in a trailer braking system.

6 Claims, 3 Drawing Figures

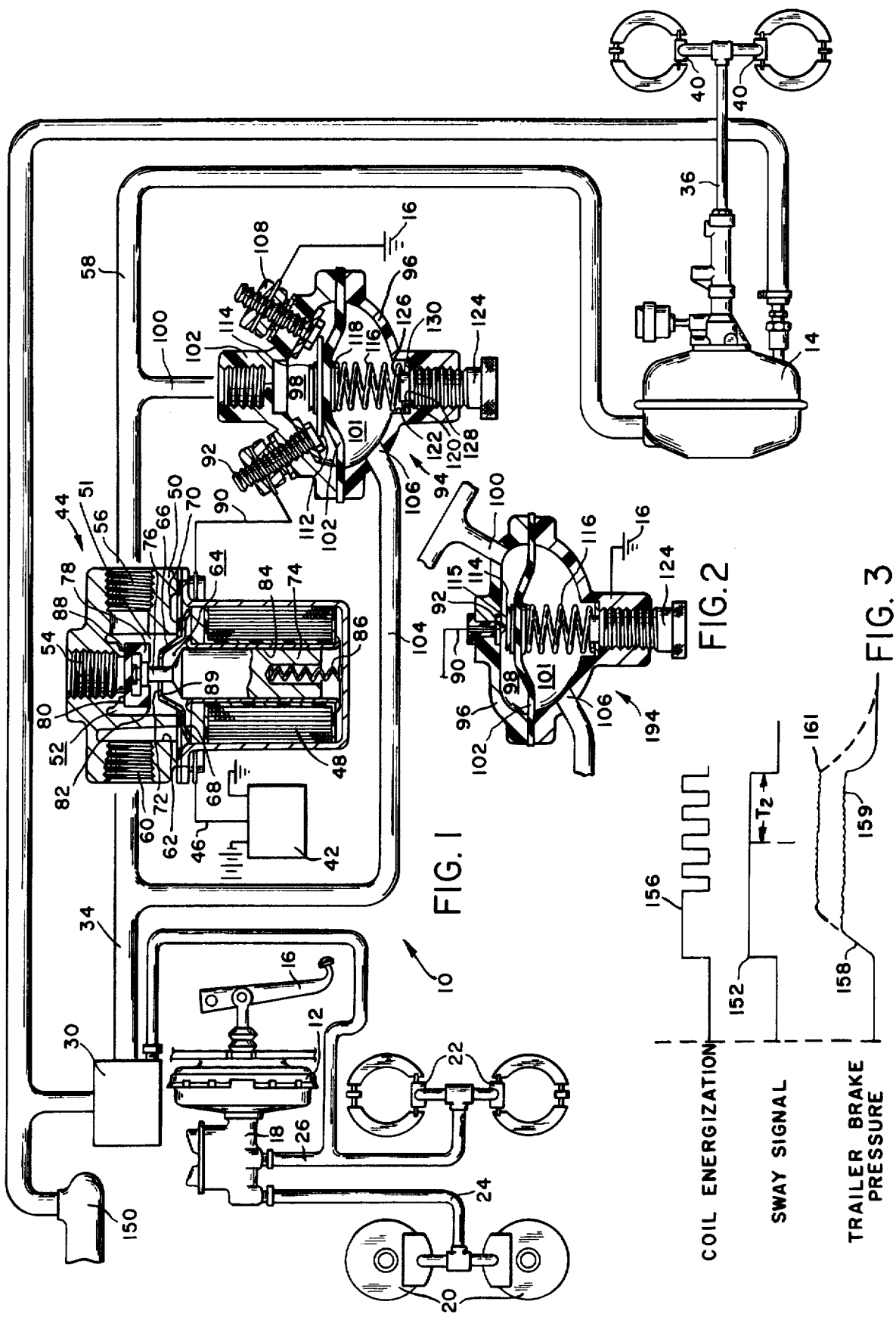

PRESSURE LIMITER MEANS FOR CONTROLLING THE OPERATION OF A SOLENOID VALVE

BACKGROUND OF THE INVENTION

With an ever increasing number of people purchasing recreational vehicles, for safety, it is very important that stability between a towing vehicle and a trailer be maintained while traveling at turnpike speeds. One form of instability exhibited by tow vehicles-trailers combination is trailer sway. Swaying causes the trailer to oscillate back and forth in a manner similar to the oscillation of pendulum. This instability results in severe yawing in the trailer which can lead to loss of steering control of the towing vehicle.

To alleviate sway instability, some larger trailers are equipped with damping or spring devices attached to the hitch. These damping devices normally consists of at least one shock absorber located on each side of the tongue of the trailer. These devices improve trailer sway control at speeds slower than the desired speed for normal highway driving.

In addition, stiffening of the sidewalls of the tires on trailers helps to dampen some of the sway forces when traveling at low speeds. However, it has been found that at high speeds the damping characteristics of the tires have little overall effect on the total oscillatory movement of the trailer.

In U.S. Pat. No. 3,893,692, incorporated herein by reference, an anti-sway apparatus is disclosed which has a comparator means that compares lateral movement of the front of a trailer with that at the rear. Whenever oscillatory forces in a trailer reach a predetermined value the comparator supplys an actuation signal which momentarily operates a brake applying servomotor. The anti-sway apparatus includes a first sensor located at the front and a second sensor located at the rear of the trailer. The first and second sensors supply the comparator means which is located at the center of gravity of the trailer with signals representative of the lateral movement in the trailer. As long as the first and second sensors supply the comparator means with substantially the same signal, the comparator means remains inactive. Whenever the first and second sensors supply the comparator means with different signals, the anti-sway apparatus is activated. Activation of the antisway apparatus develops a brake signal which operates the brake applying servomotor. Operation of the brake applying servomotor supplys the wheel brakes in the trailer with a braking signal. Unfortunately, under some conditions the intensity of the brake signal from the anti-sway apparatus causes the servomotor to be activated at such a speed that the wheel brakes in the trailer lock. When the trailer wheels are locked, another instability condition is created between the tow vehicle and the trailer.

SUMMARY OF THE INVENTION

We have devised a switch means for modifying a brake actuation signal generated by a solenoid valve means which limits an operational force created in a brake applying servomotor and thereby prevents locking of the brakes in a trailer brake system.

The switch means includes a housing with a cavity therein. A diaphragm separates the cavity into a first chamber and a second chamber. The first chamber is connected to the solenoid valve means and receives the brake activation signal at substantially the same time as he servomotor. A first electrical contact secured to housing is connected to the operational coil of the solenoid valve means. A spring and a reference signal urge a grounded second electrical contact carried on the diaphragm into engagement with the first electrical contact to allow a sway signal to energize an operational coil in the solenoid valve means. When the solenoid valve means is activated, a brake activation signal is developed. When the brake activation signal reaches a predetermined value, the spring and the reference signal are overcome and the energization of the coil interrupted to correspondingly interrupt the brake signal developed by the servomotor. When the brake activation signal is interrupted, the brake signal is reduced. Thereafter, the spring and reference signal again urge the second electrical contact into engagement with the first electrical contact and reestablish the ground connection to permit the sway signal to reenergize the coil. When the coil is reenergized, the brake activation signal is again transmitted to the servomotor until such time that the brake activation signal is sufficient to overcome the reference signal and spring to again disconnect the second contact from the first contact and interrupt the energization of the coil by the sway signal. The sequential interruption of the energization of the coil in the solenoid valve means continues for the duration of the sway control signal. Since the brake activation signal is only created during energization of the operational coil, a modulation occurs in the operation of servomotor and thereby reduces the possibility of locking of the wheel brake in the trailer.

It is the object of this invention to provide a solenoid valve with means to modulate the creation of a break activation signal supplied a brake applying servomotor to limit the brake signal communicated to the wheel brakes in a trailer.

It is another object of this invention to provide a switch means for limiting the development of a brake activation signal created by the operation of a solenoid valve to prevent the output of a servomotor from locking the wheel brakes in a trailer.

It is another object of this invention to provide a trailer braking system having a solenoid valve means, which supplies a servomotor with a brake activation signal in response to a sway signal, with modulating means to limit the output of a servomotor.

These and other objects will become apparent from reading this specification and viewing the drawings.

DESCRIPTION OF THE DRAWINGS

FIG. 1 is a schematic illustration of a tow vehicle-trailer braking system incorporating the teachings of our present invention;

FIG. 2 is a secondary embodiment of a pressure limiter switch for use in the tow vehicle-trailer braking system of FIG. 1; and FIG. 3 is a graph which illustrates operational signals generated by various sway control components in the tow vehicle-trailer braking system in FIG. 1.

DETAILED DESCRIPTION OF THE EMBODIMENT

A tow vehicle-trailer braking system 10, as illustrated in FIG. 1, has a first brake applying servomotor 12 in the tow vehicle and a second brake applying servomotor 14 in the trailer. The first brake applying servomotor 12 is actuated by an operator input applied to pedal 16. Movement of pedal actuates the servomotor 12 to provide master cylinder 18 with a force which moves a piston therein and supplies the front and rear wheel brakes 20 and 22 with a brake signal through conduits 24 and 26, respectively.

The brake signal supplied the rear wheels 22 is converted by the relay control means 30, fully described in U.S. patent application Ser. No. 634,692 and now U.S. Pat. No. 4,023,863, and incorporated herein by reference, into a trailer braking signal. The trailer braking signal is transmitted through conduit 34 to operate the second brake applying servomotor 14. Activation of the second brake applying servomotor 14, supplys the wheel brakes 40 in the trailer with a trailer braking signal which compliments the braking signal in the tow vehicle.

The trailer brake system includes a sway control sensor 42, similar to that disclosed in U.S. Pat. No 4,023,863. The sway control sensor 42 is connected to a solenoid valve 44 through lead 46. The sway control sensor 42 supplies coil 48 in the solenoid valve 44 with a sway control signal in response to an adverse sway condition in the trailer. The solenoid valve 44 has a housing 50 with a cavity 51 therein connected to the atmosphere through a first port 54, to the servomotor 14 by conduit 58 attached to port 56, and to relay control 30 by conduit 34 attached to port 60. A wall 66 separates cavity 51 into a first chamber 52 and a second chamber 64. A passage 62 in housing 50 connects the port 60 with the second chamber 64. The wall 66 has a series of openings 68 located adjacent a groove 70 for providing a flow path between passage 62 and chamber 64 and a central opening 72 for providing a flow path between the second chamber 64 and first chamber 52.

A plunger 74 positioned in coil 48 has a stem 76 which extends through the central opening 72 in wall 66 into chamber 52. A head 78 attached to the end of the stem 76 has a first face 80 and a second face 82. A spring 86 in bore 84 urges the first face 80 against seat 88 to prevent communication of air through port 54 into the first chamber 52.

An electrical ground lead 90 attached to coil 48 connects the solenoid valve 44 with a first electrical contact 92 on a pressure limiter means 94.

The pressure limiter means 94 has a housing 96 with a cavity therein. A wall or diaphragm 102 separates the cavity into a first chamber 98 and a second chamber 101. The housing 96 has a port 102 which is connected to conduit 58 through a conduit 100 to provide chamber 98 with a connection with servomotor 14. The housing 96 has a port 106 which is connected to conduit 34 through conduit 104 to connect chamber 101 with relay control 30. A second electrical contact 108 is attached to the housing 96 and an electrical ground 16. A disc 112 located on the diaphragm 102 by a retainer 114 is adapted to connect the first electrical contact 92 to the second electrical contact 108. A spring 116, which has a first end 118 attached to retainer 114 and a second end 120 aligned in guide bore 122, urges disc 112 toward the first and second electrical contacts 92 and 108. A screw 124 which has a projection 126 extending through opening 128 of washer 130 is adjustable to change the load on spring 116. By varying the spring force urging the disc 112 toward the first and second contacts 92 and 108 the intensity of the operational brake signal generated through the operation of the solenoid valve 44 can be adjusted to meet different trailer loads.

MODE OF OPERATION OF THE EMBODIMENT

To initiate braking, an operator applies an input force on pedal 16 to operate the servomotor 12 which in turn develops an operational input to activate the master cylinder 18. The output from the master cylinder 18 simultaneously supplies the rear wheels 22 in the tow vehicle and relay control means 30 with a brake signal. The relay control means 30 communicates a corresponding trailer brake signal through conduits 34 and 58 to operate the servomotor 14 in the trailer. Activation of servomotor 14 supplies wheel brakes 40 in the trailer with a brake signal corresponding to the brake signal originating in the tow vehicle.

When the operator terminates the input force on pedal 16, the relay control means 30 allows vacuum developed in the manifold 150 to evacuate air from servomotor 14 and terminate the trailer brake signal.

When the operating characteristics in the trailer activate a sensor means in the sway control means 42, a sway control signal, illustrated by line 152 in FIG. 3, is transmitted through lead 46 to coil 48 of the solenoid valve 44. When lead 90 of coil 48 is connected to the electrical ground 16 by way of first electrical contact 92, disc 112 and second electrical contact 108, electrical current energizes the coil 48.

Energization of coil 48 moves plunger 74 to the center of a magnetic field created between the ends of the coil 48. Initial movement of plunger 74 allows the first face 80 to move away from seat 88 and permit air to enter chamber 52. Further movement of plunger 74 seats the second face 88 on rib 89 to prevent evacuation of air from chamber 52 into the second chamber 64 by vacuum present in conduit 34. The communication of air into the first chamber 52 develops a brake activation signal which is simultaneously carried in conduit 58 to the servomotor 14 and into chamber 98 of the pressure limiter means 94. The brake activation signal operates servomotor 14 to provide the wheel brakes in the trailer with an independent brake signal. This brake signal which is supplied wheel brakes 40 causes the trailer to move at a rate different than the tow vehicle and thereby attenuates swaying of the trailer.

At the same time, the brake activation signal in chamber 98 acts on diaphragm 102. When a predetermined brake activation signal develops, diaphragm 102 moves disc 112 away from first contact 92 to disconnect the ground connection of lead 90 and thereby interrupts the energization of coil 48. With coil 48 deenergized, spring 86 moves face 80 into engagement with seat 88 to interrupt the communication of air into chamber 52 and unseat face 82 from rib 89 to allow vacuum present in conduit 34 to evacuate air from conduit 58 by way of chamber 52, chamber 64, and passage 62. The removal of air from conduit 58 simultaneously reduces the brake activation signal in both the servomotor 14 and chamber 98 of the pressure limiter means 94. When the brake activation signal is sufficiently reduced, spring 116 moves disc 112 into engagement with the first contact 92 and reestablishes the ground connection of coil 48. With the coil 48 grounded, the sway signal reactivates coil 48 and recenters the plunger 74 in the magnetic field to permit the communication of air into chamber 52. The sway control signal supplied coil 48 is illustrated by line 152 in FIG. 3 while the operation of coil 48 during a typical sway control signal is illustrated by line 156 in FIG. 3. At the same time the output of servomotor 14 follows a curve illustrated by line 158 in FIG.

3. By changing the tension on spring 116 through movement of screw 124, it is possible to change the output of the servomotor from a first level 159 to a second level 161. by modulating the brake activation signal which is transmitted to the servomotor 14, the brake signal supplied to the wheel brakes 40 is prevented from reaching a level which could lock the wheel brakes on the trailer under normal circumstances.

When the sway control signal 152 terminates, spring 86 urges face 80 toward seat 88 to allow vacuum present in conduit 34 to evacuate air from the servomotor 14 and chamber 98 and thereby terminate the brake signal supplied the wheel brakes 40.

In the pressure limiter means 194 shown in FIG. 2, where the structure is identical to the pressure limiter means 94 in FIG. 1, the same reference numerals are used.

The pressure limiter means 194 includes a housing 96 with a chamber 98 separated from chamber 101 by a diaphragm 102. An electrical contact 92 attached to housing 96 is connected to coil 48 in the solenoid valve means 44 by lead 90. A retainer 114 which is attached to diaphragm 102 is urged against contact 92 by spring 116. The tension in spring 116 can be changed by moving adjusting screw 124. The housing 96 is directly connected to an electrical ground 16. Chamber 101 is connected to conduit 34 and at all times receives the same pressure as contained therein to establish a reference pressure signal. chamber 98 is connected to conduit 58 and at all times receives the pressure signal contained therein. Whenever a sway signal energizes coil 48, the brake activation signal, represented by air pressure, is communicated into chamber 98. When the pressure differential between the brake activation signal and the reference signal is sufficient to overcome spring 116, contact surface 115 on retainer 114 moves away from contact 92 and interrupts the electrical ground 16 connection through spring 116. With the electrical ground of coil 48 disconnected, spring 86 urges face 80 against seat 88 to allow vacuum present in conduit 34 to evacuate air from conduit 58 and thereby reduce the intensity of the brake activation signal. When the brake activation signal is sufficiently reduced, spring 116 moves contact 115 into engagement with contact 92 to reestablish the electrical ground connection and permit the sway signal to energize the coil 48 in the solenoid valve 44. This sequential interruption of the ground connection of the coil 48 in the solenoid valve 44 modulates the brake activation signal supplied the servomotor and thereby limits the brake signal which is subsequently communicated to the wheel brakes 40 in the trailer.

We claim:

1. In combination with a solenoid valve, a sway sensor and a servomotor, switch means for limiting the communication of a brake activation signal from said solenoid valve which operates said servomotor in response to a sway control signal developed in said sway sensor, said switch means comprising:

a housing having a cavity therein;
   wall means located in said cavity, said cavity being adapted to receive said brake activation signal;
   a first contact connected to said solenoid valve;
   a second contact attached to said wall means for connecting said first contact with an electrical ground to allow said sway signal to energize said solenoid valve and produce said brake activation signal, said wall means responding to a predetermined brake activation signal by moving said second contact away from said first contact to interrupt the energization of said solenoid valve and thereby modulate the development of said brake activation signal; and
   resilient means connected in said wall means for urging said second contact into engagement with said first contact, said brake activation signal overcoming said resilient means in moving said second contact away from said first contact.

2. The combination, as recited in claim 1, wherein said switch means further includes:
   adjustment means for changing the resistance of said resilient means with respect to said brake activation signal to change said predetermined brake activation signal.

3. The combination, as recited in claim 2, wherein said wall means includes:
   a diaphragm secured to said housing for separating said cavity into a first chamber and a second chamber, said first chamber being adapted to receive said brake activation signal, said second chamber being adapted to receive a reference signal, said reference signal and said resilient means acting on said diaphragm to resist movement thereof by said brake activation signal.

4. The combination, as recited in claim 3, wherein said wall means further includes:
   retainer means attached to said diaphragm for aligning said second contact with said first contact and said resilient means with said adjustment means.

5. The combination, as recited in claim 4, wherein said switch means further includes:
   a third contact for connecting said housing to said electrical ground.

6. The combination, as recited in claim 5, wherein said second contact includes:
   a disc positioned on said retainer for providing a connection between said first and third contacts to provide a ground connection for a coil in said solenoid valve.

* * * * *